US012080504B2

(12) United States Patent
Cawood et al.

(10) Patent No.: US 12,080,504 B2

(45) Date of Patent: Sep. 3, 2024

(54) MECHANICAL FUSE STRIKER

(71) Applicant: ABB Schweiz AG, Baden (CH)

(72) Inventors: Matthew Cawood, Ormond Beach, FL (US); Aaron Motes, Ormond Beach, FL (US)

(73) Assignee: ABB SCHWEIZ AG, Baden (CH)

( * ) Notice: Subject to any disclaimer, the term of this patent is extended or adjusted under 35 U.S.C. 154(b) by 361 days.

(21) Appl. No.: 17/534,031

(22) Filed: Nov. 23, 2021

(65) Prior Publication Data

US 2022/0163306 A1 May 26, 2022

Related U.S. Application Data

(60) Provisional application No. 63/117,343, filed on Nov. 23, 2020.

(51) Int. Cl.
*H01H 85/30* (2006.01)

(52) U.S. Cl.
CPC .................................. *H01H 85/303* (2013.01)

(58) Field of Classification Search
CPC .. H01H 85/303; H01H 31/125; H01H 85/042; H01R 13/6666
See application file for complete search history.

(56) References Cited

U.S. PATENT DOCUMENTS 2,922,007 A * 1/1960 Edmunds ............... H01R 13/68 337/139
10,655,367 B2 * 5/2020 Ferri ....................... E05C 17/02

FOREIGN PATENT DOCUMENTS

DE 1730183 U 9/1956
DE 29605370 U1 5/1996

OTHER PUBLICATIONS

Extended European Search Report, issued by the European Patent Office, regarding corresponding patent application Serial No. EP 21209777.8; dated Apr. 4, 2022; 7 pages.

* cited by examiner

*Primary Examiner* — Briggitte R. Hammond
(74) *Attorney, Agent, or Firm* — Greenberg Traurig, LLP

(57) ABSTRACT

A strike pin assembly for a fuse assembly in which the strike pin assembly is maintained in a locked position by a holding force of a filament and an interference provided by a plurality of retention bodies. Upon a breakage of the filament, such as, for example, in response to heat generated by operation of a fuse element, a trigger can be displaced via a first biasing force in a distal direction such that the trigger is positioned at a location that does not impede an inward displacement of a plurality of retention bodies from a recess of a firing pin. Upon the inward displacement of the retention bodies, a second biasing force can displace the firing pin in the distal direction such that a portion of the firing pin can protrude out from an adapter of the strike pin assembly.

17 Claims, 7 Drawing Sheets

MECHANICAL FUSE STRIKER

RELATED APPLICATION

This application claims priority to U.S. Provisional patent application Ser. No. 63/117,343, filed on Nov. 23, 2020; the entirety of which is incorporated by reference.

FIELD OF INVENTION

The present application relates to electrical fuses, and more particularly, to a mechanical fuse striker.

BACKGROUND

Electrical systems and circuits can often include safety devices that can provide at least a degree of overcurrent protection. With respect to at least some electrical systems, such safety devices can include electrical fuses. Traditionally, such fuses have utilized an electrically conductive element through which current flows. In the event of an overcurrent condition, such as, for example, a current surge and/or overloading, the amount of current flowing through the conductive element can melt the conductive element. Such melting of the conductive element can interrupt the flow of current through at least the fuse, and result in the opening of the associated circuit.

At least certain types of fuses can utilize a striker element that can be displaced relative to the fuse so as to provide a visual indication that the fuse has been blown, and/or provide a force to facilitate a triggering of the opening of an associated circuit. However, certain types of indicators can have a construction that can, at least to some extent, cause the indicator to interfere with the responsiveness of the fuse and/or the interrupting capabilities of the fuse. Further, at least certain types of fuses, including fuses utilized in medium and/or high voltage applications, can include explosive powders, among other materials, that, when heated in response to an overcurrent condition, combust in a manner that generates an explosive force that can displace the strike element. Yet, such explosive materials can present challenges with respect to at least shipping the associated fuses. Additionally, the explosive materials can at times be inconsistent, which can increase the potential for overcurrent conditions damaging other components of the electrical system.

Accordingly, although various types of electrical fuses are currently available in the marketplace, further improvements are possible to provide electrical fuses having striker elements that do not utilize explosive materials, and/or which assist in tripping an associated circuit without adversely impacting the responsiveness of the fuse to overcurrent conditions.

BRIEF SUMMARY

In some embodiments, a fuse assembly includes: a casing having an interior region, the interior region housing at least a portion of a fuse element and a filament; and a strike pin assembly including: a cap coupled to the casing, the cap having a plurality of openings; an adapter coupled to the cap; a firing pin housed within the adapter, at least a distal end of the cap being positioned within an aperture of the firing pin when the strike pin assembly is at a locked position, the aperture having a recess that is separated from a proximate end of the firing pin by a retention wall, at least a portion of the firing pin sized to be displaced to a position outside of the adapter upon a release of the strike pin assembly from the locked position; a plurality of retention bodies, at least a portion of the plurality of retention bodies being positioned, when the strike pin assembly is at the locked position, within the recess and at least partially extending into an adjacent opening of the plurality of openings of the cap; a trigger being releasably secured within a cavity of the cap by the filament when the strike pin assembly is in the locked position, at least a portion of an engagement section of the trigger being positioned adjacent to the plurality of openings when the strike pin assembly is in the locked position and sized to prevent removal of the plurality of retention bodies from the recess of the firing pin through the plurality of openings, the trigger further including a recessed section sized to accommodate a displacement of each of the plurality of retention bodies from the recess of the firing pin and at least partially through the plurality of openings and into the cavity of the cap in response to the release of the strike pin assembly from the locked position; a first biasing element positioned to displace, in response to a breakage in the filament, the trigger in a distal direction and to a location at which the recessed section accommodates the displacement of each of the plurality of retention bodies; and a second biasing element positioned to displace the firing pin in the distal direction in response to the displacement of each of the plurality of retention bodies.

In some embodiments, the plurality of openings of the cap are positioned adjacent to a distal end of the cap, a proximate end of the cap being coupled to the casing.

In some embodiments, the cap further includes a base portion, a first projection, and a second projection, the base portion being coupled to the cap, the first projection being coupled to the adapter, and the second projection housing the trigger and the first biasing element, the plurality of openings extending through the second projection.

In some embodiments, the first projection of the cap is threadingly coupled to the adapter.

In some embodiments, the cavity of the cap is a second cavity of the second projection, the first projection having a first cavity that is in fluid communication with an inner region of the base portion of the cap, the first cavity and the second cavity being at least partially separated by a cavity wall, the cavity wall having an opening sized to accommodate passage of the filament through the first cavity and into the second cavity.

In some embodiments, the first cavity provides a central support location for at least one of the fuse element and a support core for the fuse element.

In some embodiments, the fuse element includes a polyetheretherketone (PEEK) material.

In some embodiments, the retention wall of the firing pin includes an inner surface that abuts the plurality of retention bodies when the firing pin is at the locked position, the inner surface being tapered to facilitate the displacement of the plurality of retention bodies.

In some embodiments, the firing pin has a base portion and a projection portion, the base portion being housed within a first bore of the adapter, at least a portion of the projection portion being positioned in a second bore of the adapter and configured to extend from the adapter in response to the strike pin assembly being released from the locked position.

In some embodiments, the adapter includes a bore retention wall at a distal end of the first bore that is sized to abut a shoulder of the firing pin to limit a distance of displacement of the firing pin in the distal direction.

In some embodiments, the fuse assembly further includes a first seal positioned about the projection portion of the firing pin and against an inner surface of the second bore.

In some embodiments, the fuse assembly further includes a second seal positioned about a distal end of the adapter, and wherein a distal end of the projection portion is configured to puncture the second seal.

In some embodiments, the second biasing element has a spring force that is larger than a spring force of the first biasing element.

In some embodiments, the fuse assembly further includes at least a portion of the second biasing element is axially positioned to overlap at least a portion of the first biasing element.

In some embodiments, a method for operating a strike pin assembly of a fuse assembly includes: releasing a holding force provided by a filament of the fuse assembly on a trigger of the strike pin assembly, the holding force maintaining the trigger at a position that prevents a displacement of a plurality of retention bodies from a recess of a firing pin of the strike pin assembly; displacing, upon the release of the holding force and via a biasing force of a first biasing element, the trigger in a first direction toward a distal end of the strike pin assembly; displacing, upon displacement of the trigger, the plurality of retention bodies from the recess of the firing pin; and displacing, in response to the displacement of the plurality of retention bodies and via a biasing force of a second biasing element, the firing pin in the first direction such that a distal end of the firing pin protrudes out of an adapter of the strike pin assembly.

In some embodiments, the releasing of the holding force includes breaking the filament in response to a temperature generated by operation of a fuse element of the fuse assembly.

In some embodiments, displacing the trigger includes displacing the trigger to a location at which a recessed section of the trigger is positioned to accommodate the displacement of at least a portion of each of the plurality of retention bodies through an adjacent opening in a cap of the strike pin assembly.

In some embodiments, the trigger is released by the holding force from a position within a cavity of a projection of the cap, and wherein the first and second biasing elements are at least partially positioned on opposing sides of the projection.

In some embodiments, the displacement of the plurality of retention bodies includes displacing the plurality of retention bodies along a tapered inner surface of a retention wall of the recess of the firing pin to a recessed section of the trigger.

In some embodiments, the method further includes preventing, by the trigger prior to the release of the holding force, displacement of the plurality of retention bodies.

BRIEF DESCRIPTION OF THE DRAWINGS

The description herein makes reference to the accompanying figures wherein like reference numerals refer to like parts throughout the several views.

Figure 1:
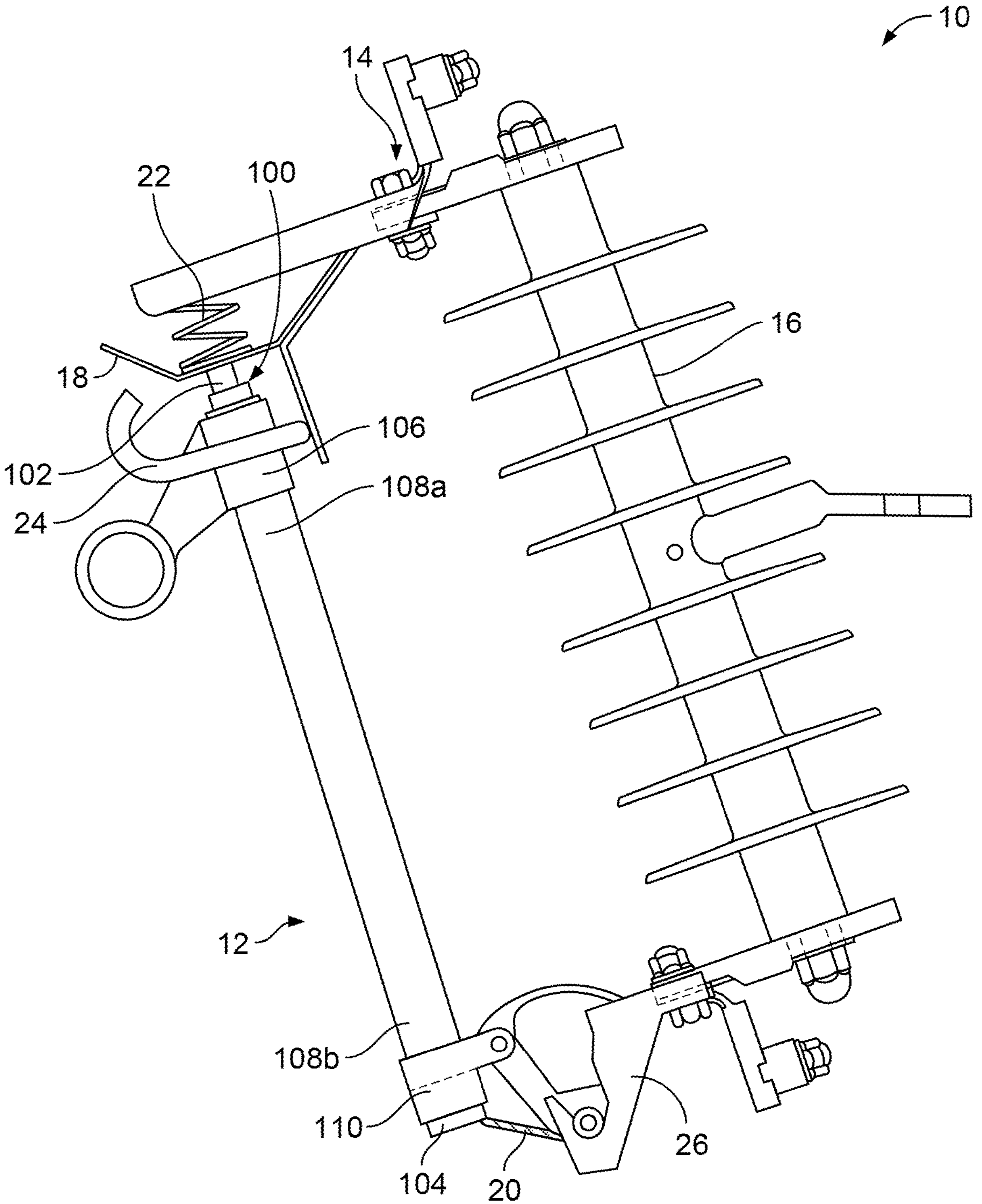
FIG. 1 illustrates a side view of an exemplary embodiment of a fuse cutout assembly utilizing a fuse assembly having a strike pin assembly, according to an illustrated embodiment of the present application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a side view of an exemplary embodiment of a fuse cutout assembly 10 utilizing a fuse assembly 12 having a strike pin assembly 100 according to an illustrated embodiment of the present application. The fuse cutout assembly 10 can be utilized, for example, in connection with providing protection from at least current surges and overloads in high and medium voltage electric utility services, including, but not limited to, in electrical transmission systems and distribution systems operating at nominal voltages of about 3 kilovolts (kV) to about 38 kV, among other voltages and voltage ranges. In addition to the fuse assembly 12, the fuse cutout assembly 10 can include a cutout body 14 that supports the fuse assembly 12, and to which an insulator 16 is attached. The cutout body 14 can include an upper contact 18 and a lower contact 20 at opposing ends of the cutout body 14 that are positioned to be electrically coupled to a first contact 102 and a second contact 104, respectively, of the fuse assembly 12. The upper contact 18 can be biased by a biasing element 22, such as, for example, a spring, so as to provide a biasing force that at least attempts to maintain an engagement between the upper contact 18 of the cutout body 14 and the first contact 102 of the fuse assembly 12.

The cutout body 14 can include an attachment hook 24 that can be sized to receive, and relatively securely engage, an upper casting or sleeve 106 that can be coupled to an upper end 108 of the fuse assembly 12. Further, the cutout body 14 can also include a lower bracket or hinge 26 that can be pivotally coupled to a lower casting or sleeve 110 that is coupled to a lower end 108*b* of the fuse assembly 12. The lower bracket or hinge 26 of the cutout body 14 and the lower casting or sleeve 110 can be configured to accommodate pivotal displacement of the fuse assembly 12 about the cutout body 14 as the first contact 102 of the fuse assembly 12 is being displaced into, or, conversely, from, electrical engagement with the upper contact 18 of the cutout body 14.

As seen in FIG. 1, when the fuse assembly 12 is supported by the cutout body 14, and the first contact 102 of the fuse assembly 12 is electrically coupled to the upper contact 18 of the cutout body 14, the cutout body 14 supports the fuse assembly 12 at an angle. As discussed below, in the event of activation of the strike pin assembly 100, such as, for example, in response to a current surge or overload event, the strike pin assembly 100 can exert a force against the upper contact 18 in manner that can depress the biasing element 22 away from the fuse assembly 12 so as to facilitate physical and/or electrical disengagement between the first contact 102 of the fuse assembly 12 and the upper contact 18. In the event the fuse assembly 12 is to be disengaged from direct contact with the first contact 102 of the cutout body 14, the angle at which the fuse assembly 12 is supported by the cutout body 14 can allow gravitational forces to at least assist in the fuse assembly 12 being pivotally displaced about the lower bracket or hinge 26 of the cutout body 14 such that the first contact 102 of the fuse assembly 12 is rotated away from the upper contact 18 of the cutout body 14. Such pivotal displacement can, according to at least some embodiments, be further facilitated by another biasing element that can provide a biasing force that is transmitted generally to the lower end 108*b* of the fuse assembly 12, and which at least assists in facilitating pivotal displacement of the fuse assembly 12 about the lower bracket or hinge 26.

Figure 2:
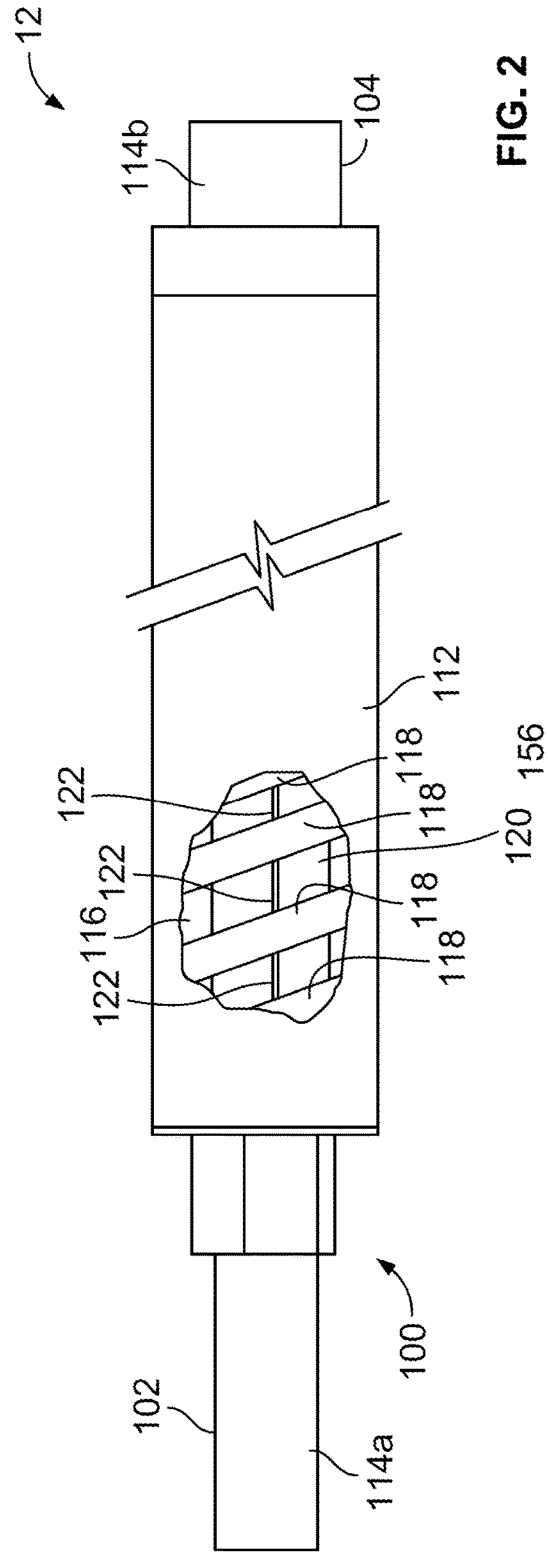
FIG. 2 illustrates a partial cutaway side view of an exemplary embodiment of a fuse assembly having a strike pin assembly, according to an illustrated embodiment of the present application.
Figure 3:
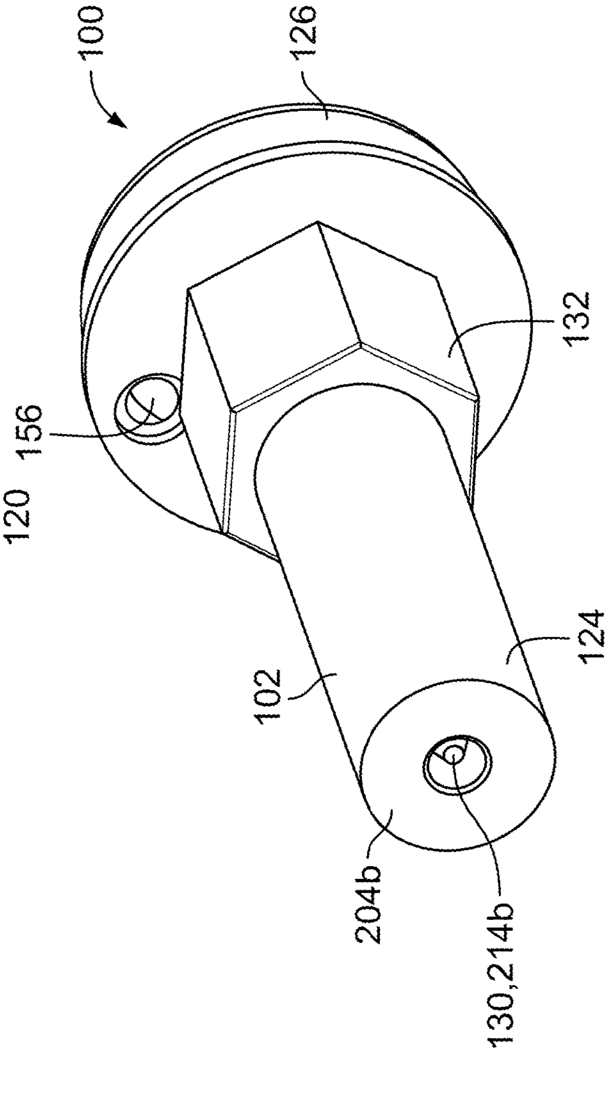
FIG. 3 illustrates a perspective view of an exemplary embodiment of a strike pin assembly, according to an illustrated embodiment of the present application.

FIG. 2 illustrates a partial cut away side view of an exemplary embodiment of a fuse assembly 12 having a strike pin assembly 100 according to an illustrated embodiment of the present application. As seen, the fuse assembly 12 includes a casing 112 that is positioned between a first end cap 114*a* and a second end cap 114*b* that are located at opposing ends of the fuse assembly 12. According to the illustrated embodiment, the first end cap 114*a* and the second end cap 114*b* can provide the first contact 102 and the second contacts 104, respectively, of the fuse assembly 12. Thus, the first end cap 114*a* and the second end cap 114*b* can be constructed from a metallically conductive material, such as, for example, but not limited to, brass, copper, silver, and/or tin, among other materials, as well as various combinations thereof. The casing 112 can be constructed from a variety of materials including, but not limited to, electrically insulating materials. For example, according to certain embodiments, the casing 112 can be constructed from a ceramic material.

As seen by the cutaway portion of FIG. 2, the casing 112 can generally define an interior region 116 of the fuse assembly 12 that can extend along the casing 112 between the first end cap 114*a* and the second end cap 114*b*, and which can house one or more components of the fuse assembly 12, as well as insulating and/or arc preventing material(s), such as, for example, sand. For example, as seen in FIG. 2, the interior region 116 can house one or more fuse elements 118. The fuse element 118 is electrically coupled to the first and second contacts 102, 104, respectively, of the fuse assembly 12, and can be constructed from a variety of materials, including, but not limited to, tin, lead, silver, copper, zinc or brass, among other materials or combinations of materials. As seen in FIG. 2, according to the exemplary embodiment, the fuse element 118 is generally wrapped about a support element or support core 120 that may be constructed from an electrically insulative material. However, the fuse element 118 can be arranged within the interior region 116 of the casing 112 in a variety of other manners, including having a generally linear orientation. Further, according to certain embodiments, at least a portion of the fuse element 118 can be encased or wrapped in an elastomeric material, such as, for example, silicon rubber.

The interior region 116 can also house a wire or filament 122 that is coupled to the strike pin assembly 100. At least prior to activation of the strike pin assembly 100, the filament 122 can be maintained in a relatively taut condition such that the filament 122 can provide a holding force against at least a portion of the strike pin assembly 100 that can at least assist in preventing activation of the strike pin assembly 100. Thus, while an end of the filament 122 can be secured to the strike pin assembly 100, the other end can be secured, such as, for example, tied, adhered, and/or welded, among other forms of connection, to the second end cap 114*b* and/or within the casing 112, including, for example, at a position within the casing 112 that is generally adjacent to the second end cap 114*b*. In the event of a current surge or overload condition, the degree of current flowing through the fuse element 118 can result in the fuse element 118 generating heat, and/or cause gases within the interior region to be heated, to levels that can heat the filament 122 to a degree that can cause a break(s) or separation(s) in the filament 122. Such breakage(s) in the filament 122 can release the holding force that the filament 122 provided against the strike pin assembly 100, thereby allowing for activation of the strike pin assembly 100, as discussed below.

The filament 122 can be constructed from a variety of metallic or non-metallic materials. For example, according to certain embodiments, the filament 122 is constructed from a polyetheretherketone (PEEK) material. Additionally, at least a portion of the filament 122 can be coated by, or housed within, additional protective materials. While the filament 122 is illustrated in FIG. 2 as having a generally linear orientation as the filament 122 extends through the interior of casing 112, the filament 122 can have a variety of other configurations or orientations within the casing 112.

Referencing FIGS. 2-4B, according to the illustrated embodiment, the first end cap 114*a* of the fuse assembly 12 can comprise the strike pin assembly 100. Moreover, an outer surface 124 of the strike pin assembly 100 can include the first contact 102 of the fuse assembly 12. According to the illustrated embodiment, the strike pin assembly 100 can include a cap 126, trigger 128, firing pin 130, and adapter 132, each of which may be centrally aligned along a central axis 134 (FIG. 4B) of the strike pin assembly 100, and can constructed from an electrically conductive metallic material, such as, for example, brass, copper, silver, and/or tin, among other materials, as well as various combinations thereof. Further, the cap 126, trigger 128, firing pin 130, and adapter 132 may or may not be constructed from the same or similar material(s). As discussed below, the strike pin assembly 100 can further include one or more retention bodies 136, a first, inner biasing element 138, and a second, outer biasing element 140, each of which may also be constructed from a metallic or non-metallic material, including, but not limited to, steel.

Figure 4A:
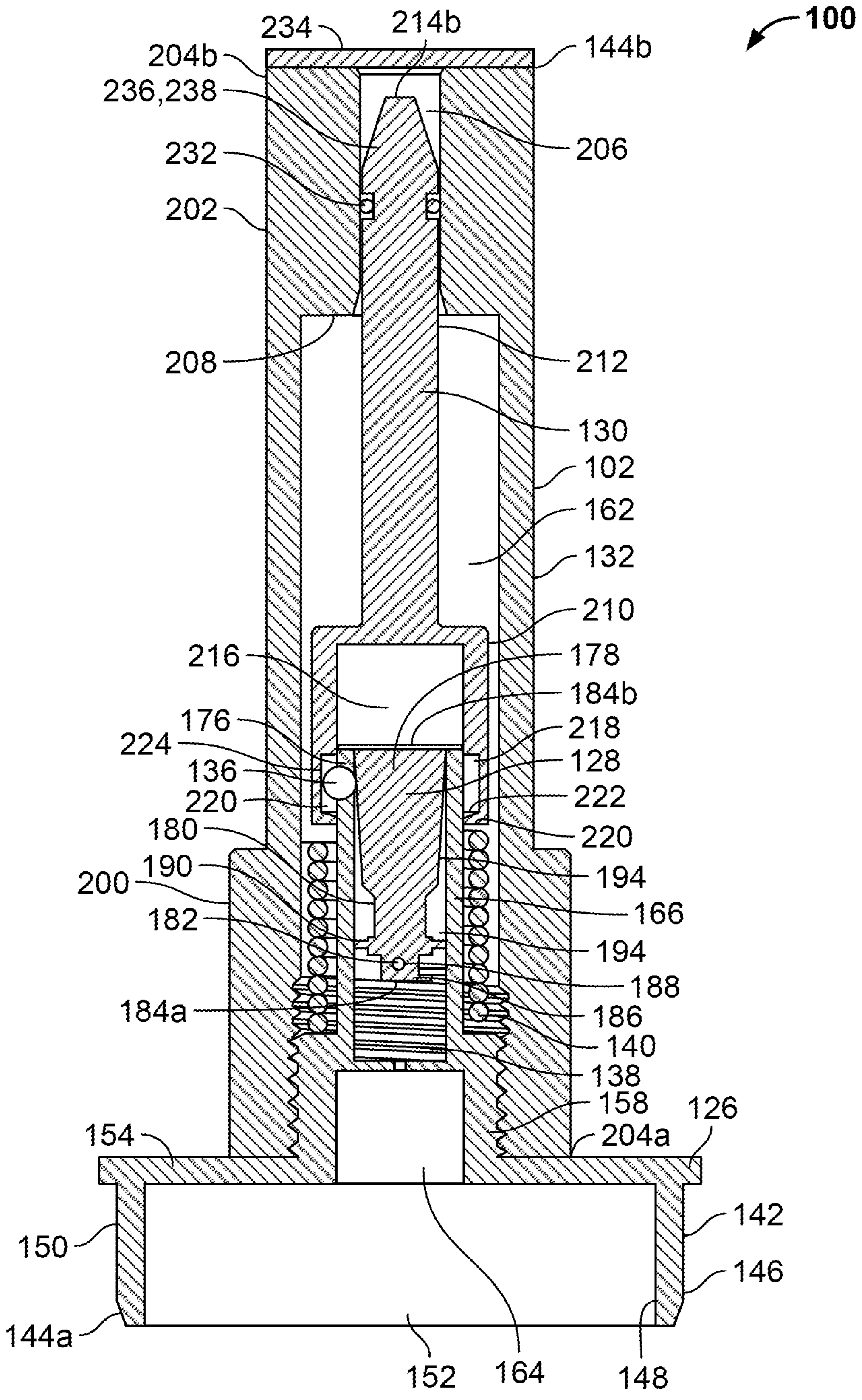
FIG. 4A illustrates a side cross sectional view of an exemplary embodiment of a strike pin assembly in a first, locked position, according to an illustrated embodiment of the present application.
Figure 4B:
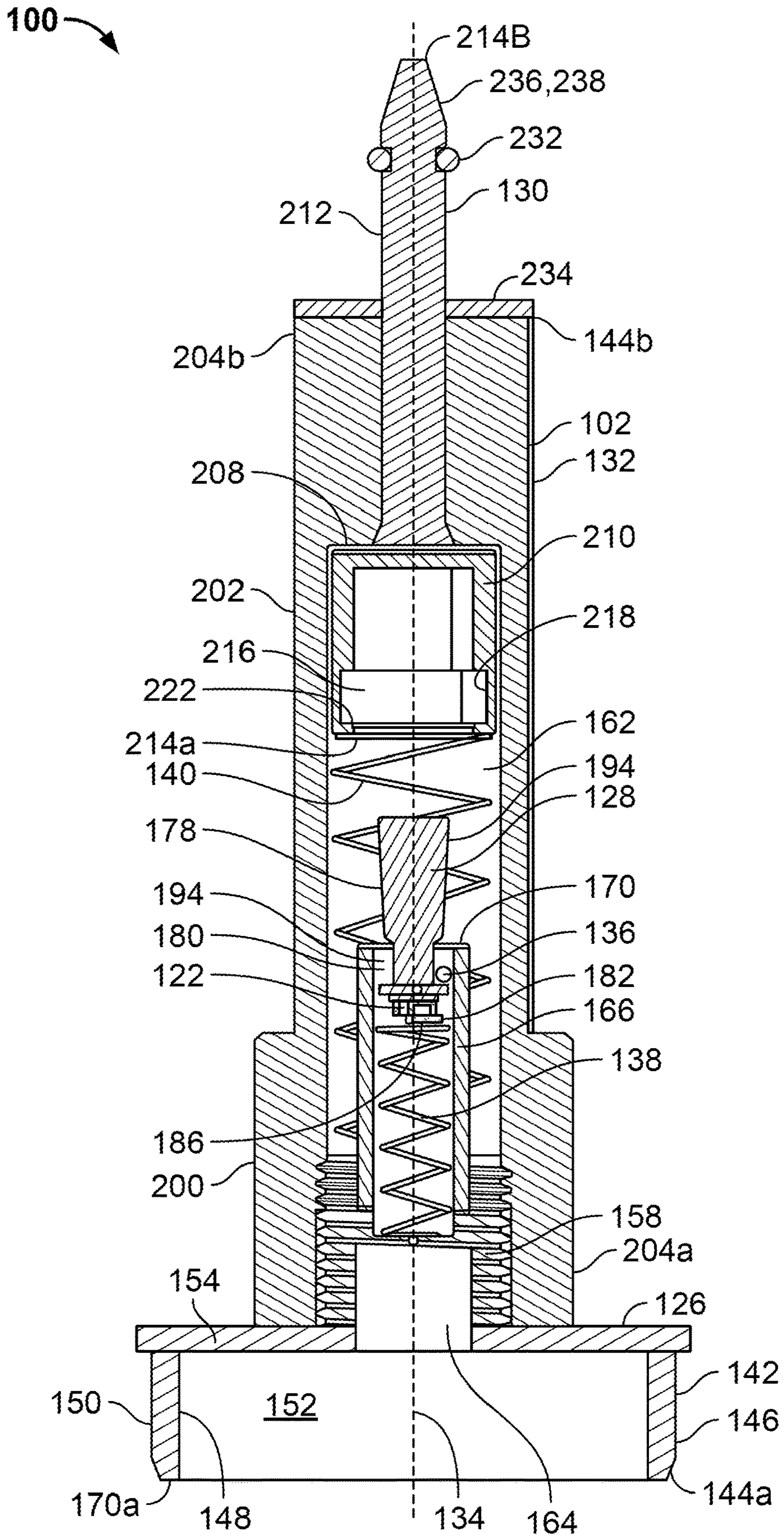
FIG. 4B illustrates a side cross sectional view of an exemplary embodiment of a strike pin assembly in a second, unlocked position, according to an illustrated embodiment of the present application.
Figure 5:
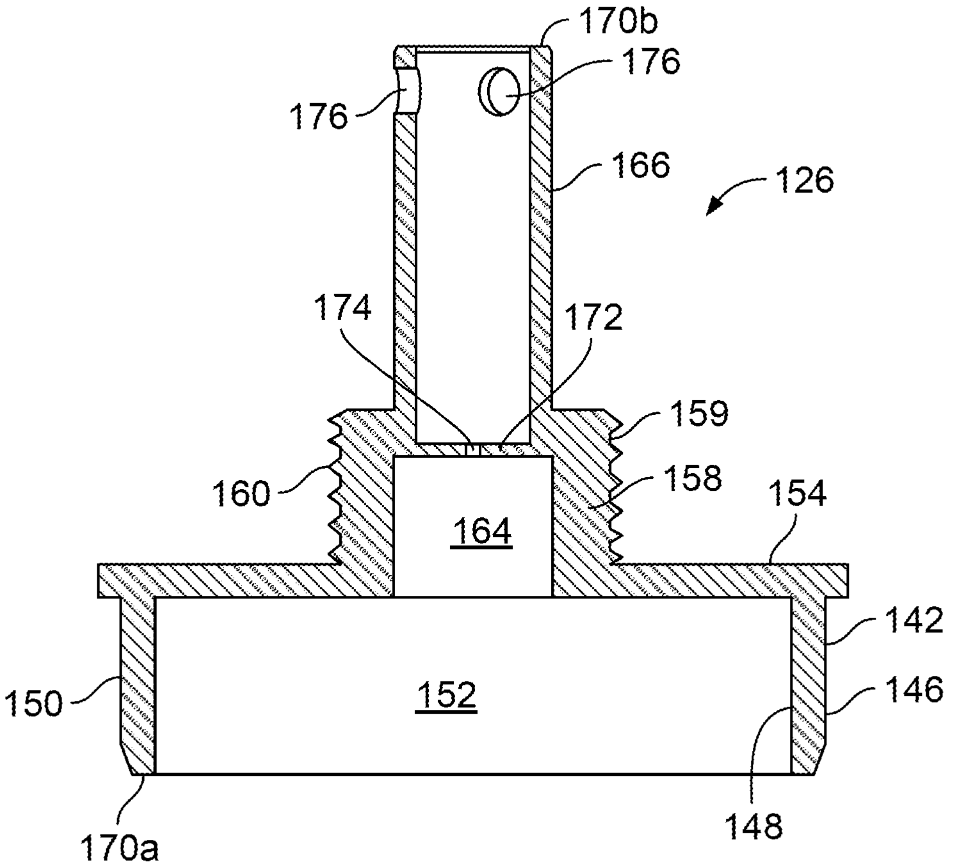
FIG. 5 illustrates a side cross sectional view of an exemplary embodiment of a cap for the strike pin assembly shown in at least FIGS. 3 and 4.

As seen in at least FIGS. 4A-5, the cap 126 can be positioned at a proximate end 144*a* of the strike pin assembly 100, and can include a base portion 142 that is sized to be coupled to the casing 112 of the fuse assembly 12. According to the illustrated embodiment, the base portion 142 of the cap 126 includes an annular wall 146 having an inner surface 148 and an outer surface 150. According to certain embodiments, the annular wall 146 can have a size such that the annular wall 146 is positioned within a portion of the interior region 116 of the casing 112. According to such an embodiment, the outer surface 150 of the annular wall 146 can be positioned adjacent to, if not abut, an inner surface of the casing 112. Alternatively, according to other embodiments, the annular wall 146 can have a size such that the annular wall 146 is positioned around an outer surface of the casing 112 such that the inner surface 148 of the of the annular wall 146 can be positioned adjacent to, if not abut, an outer surface of the casing 112. Further, the annular wall 146, and thus the cap 126, can be secured to the casing 112 in a variety of manners, including, for example, via an adhesive and/or an interference fit, among other forms of attachment.

The base portion 142 of the cap 126 can also include an upper wall 154 that extends across at least a portion of an inner area 152 of the base portion 142 that is generally defined by the annular wall 146. As shown in at least FIGS. 4A and 4B, the inner area 152 can provide an opening at a proximate end 144*a* of the strike pin assembly 100, and thus an open end at the proximate end 170*a* of the cap 126. As illustrated, according to certain embodiments, the upper wall 154 can have a size, such as, for example, a diameter, that is larger than a corresponding size, such as, for example, a diameter, of the annular wall 146 such that a portion of the upper wall 154 provides a degree of overhang over the outer surface 150 of the annular wall 146. As seen in at least FIG. 3, the upper wall 154 can further include an aperture 156 that is utilized in connection with electrically coupling the fuse element 118 to the cap 126, and thus electrically coupling the fuse element 118 to the strike pin assembly 100. The fuse element 118 can be electrically coupled to the cap 126 in a variety of different manners, including, for example, via soldering the fuse element 118, or an adjoined component of the fuse element 118, to the cap 126. Thus, prior to use of the fuse assembly 12 with the fuse cutout assembly 10, the aperture 156 is filled or closed so as to prevent the ingress of materials or items, including water, into the inner area 152 of the cap 126 and/or the interior region 116 of the casing 112.

The cap 126 can also include a first projection 158 that can generally axially extend along the central axis 134 away from the base portion 142 of the cap 126. While the first projection 158 can have a variety of shapes and/or sizes, according to the illustrated embodiment, the first projection 158 has a generally cylindrical configuration. Further, according to certain embodiments, at least a portion of an outer side 160 of the first projection 158 can be configured to engage the adapter 132 such that the cap 126 is securely mated to the adapter 132, such as, for example, via a threaded connection, among other types of connections. Thus, according to the illustrated embodiment, the outer side 160 of the first projection 158 has an external thread 159 that mates a corresponding internal thread 161 (FIG. 7) that extends along at least a portion of a first bore 162 of the adapter 132. Further, at least the outer side 160 of the first projection 158 can be positioned such that a mating attachment of the adapter 132 to the first projection 158 can assist in the adapter 132 being centrally located, and/or aligned with, the central axis 134 of the strike pin assembly 100.

The first projection 158 can generally define a first cavity 164 that extends through an end of the first projection 158 and/or the upper wall 154 such that the first cavity 164 is in fluid communication with the inner area 152 of the base portion 142. The first cavity 164 can be generally aligned along the central axis 134, and be sized to receive at least a portion of the fuse element 118 and/or the support core 120. Moreover, according to certain embodiments, the first cavity 164 can be sized and positioned to provide a location for support for, and/or assist in centering, at least the fuse element 118 and/or the associated support core 120.

The cap 126 can further include a second projection 166 that axially extends away from the first projection 158 generally along the central axis 134 and in a direction toward a distal end 170*b* of the cap 126, and thus toward a distal end 144*b* of the strike pin assembly 100. Similar to the first projection 158, according to the illustrated embodiment, the second projection 166 can have a generally cylindrical configuration having a size, such as, for example, an outer diameter, that is smaller than a corresponding size of the first projection 158. Moreover, as seen in at least FIGS. 4A and 4B, an outer side of the second projection 166 can have a size that can accommodate the placement of the larger second, outer biasing element 140, such as, for example, a spring, around the outer side of the second projection 166 and within the first bore 162 of the adapter 132. According to such an embodiment, the differences in sizes between the first projection 158 and the second projection 166, respectively, can also provide the upper wall 154 of the first projection 158, against which an end of the second, outer biasing element 140 can be positioned.

The second projection 166 can include a second cavity 168 that extends through the distal end 170*b* of the cap 126. As seen in FIGS. 4A, 4B, and 5, according to certain embodiments, the second cavity 168 can also extend into a portion of the first projection 158 such that the first cavity 164 and the second cavity 168 are separated by a cavity wall 172. Further, the cavity wall 172 can include an aperture 174 that extends between the first cavity 164 and the second cavity 168, and which thus allows the first cavity 164 to be in fluid communication with the second cavity 168 through the aperture 174. The aperture 174 is sized to accommodate passage of the filament 122 such that the filament 122 can extend through the first cavity 164 and into at least the second cavity 168. As seen in at least FIGS. 4A, 4B, and 5, according to certain embodiments, the aperture 174 can have a size, such as, for example, a diameter, that is smaller than a corresponding size of the first cavity 164, and which is similar in size to, if not slightly larger than, a corresponding size, such as, for example, diameter, of the filament 122. Such similarities in the relative sizes of the aperture 174 and the filament 122 can assist the aperture 174 in generally preventing passage of materials or items through the aperture 174 other than the filament 122.

The second projection 166 can also include one or more openings 176 that are linearly positioned at a location that is generally adjacent to the distal end 170*b* of the cap 126. Additionally, according to certain embodiments, each opening 176 can be equally radially spaced along the second projection 166 from other, adjacent openings 176. For example, according to certain embodiments, the second projection 166 includes three openings 176, each opening 176 being slightly offset below the distal end 170*b* of the cap 126 and spaced approximately 120 degrees of each adjacent opening 176. Further, as discussed below, the openings 176 are each sized to receive, and accommodate inward displacement of, a retention body 136. Thus, according to embodiments in which each of the retention bodies 136 comprises a spherically shaped ball, such as, for example, a ball bearing, the openings 176 can have a diameter that is at least slightly larger than the diameter of the corresponding retention body 136.

As seen in at least FIG. 4A, at least a portion, if not all, of the trigger 128 is sized for placement within at least a portion of the second cavity 168 while the strike pin assembly 100 is at the first, locked position. Further, as seen in at least FIGS. 4A, 4B, and 6, the trigger 128 can have a retention section 182, a recessed section 180, and an engagement section 178, the retention section 182 extending between a proximate end 184*a* and the recessed section 180 of the trigger 128, and the engagement section 182 extending from the recessed section 180 to the distal end 184*b* of the trigger 128.

The retention section 182 of the trigger 128 can include a retention arm 186 that radially extends at the proximate end 184*a* of the trigger 128, and which is configured to be secured to the filament 122 at least when the strike pin assembly 100 is at first, locked position. Moreover, the filament 122 can be secured to the trigger 128 via the retention arm 186 so that, at least when the strike pin assembly 100 is at first, locked position, the filament 122 can provide a holding force that can maintain the trigger 128 at the first, locked positon, as shown in FIG. 4A. Such a holding force provided against the trigger 128 by the filament 122 can, when the filament 122 is in a relatively taut condition, overcome a generally opposing directed biasing force that the compressed first, inner biasing element 138 can be exerting against the trigger 128 that seeks to displace the trigger 128 generally toward the distal end 144*b* of the strike pin assembly 100.

The filament 122 can be securely coupled to the retention arm 186 in a variety of different manners. For example, according to certain embodiments, the filament 122 can be inserted through an opening 188 in the retention arm 186, and/or wrapped around at least a portion of the retention arm 186, and tied off to the trigger 128, knotted, and/or bent or deformed in manner that can prevent the filament 122 from being disengaged from the trigger 128 at least while the trigger 128 is at the first, locked positon, as seen in FIG. 4A.

The retention section 182 of the trigger 128 can also include a retention base 190 that overhangs at least a portion of the retention arm 186. The retention base 190 can have a size, such as, for example, an outer diameter, that is similar, if not slightly smaller, than a corresponding size, such as an inner diameter, of the second cavity 168. Such similarities in sizes between the retention base 190 and the second cavity 168 can accommodate the retention base 190 guiding, in response to the breakage of the filament 122, the displacement of the trigger 128 in an axial direction along the second cavity 168 from the first, locked position (FIG. 4A) to the second, unlocked position (FIG. 4B). Additionally, the overhang provided by the retention base 190 can provide the retention base 190 with a lower surface 192 that can abut the first, inner biasing element 138. According to embodiments in which the first, inner biasing element 138 is a spring, with the trigger 128 being maintained at the first, locked position, the retention base 190 can be axially positioned such that the first, inner biasing element 138 is in a compressed state between the cavity wall 172 and the lower surface 192 of the retention base 190. Further, when the trigger 128 is released from the first, locked position, such as, for example, upon breakage of the filament 122 and the associated release of the holding force from the filament 122, the first, inner biasing element 138 can be decompressed, thereby transmitting a force against the retention base 190 that axially displaces the trigger 128 generally along the central axis 134 toward the second, unlocked position, as seen in FIG. 4B.

The engagement section 178 of the trigger 128 is sized to be at least partially, if not completely, housed within the second cavity 168 when the trigger 128 is in the first, locked position. Further, according to certain embodiments, the engagement section 178 may, or may not, be sized to contact the firing pin 130 after the trigger 128 is released from the first, locked position. According to the illustrated embodiment, the engagement section 178 can have a generally frustoconical shape, and moreover, comprise a tapered wall 195 that is inwardly tapered generally toward the proximate end 184*a* of the trigger 128 such that the diameter of the engagement section 182 gradually decreases along the engagement section 182. Thus, the diameter of the engagement section 178 of the trigger 128 may be its largest at the distal end 184*b* of the trigger 128, as seen in at least FIG. 6. Such an inward taper along the engagement section 178 can be configured to control the timing at which the trigger 128 can accommodate inward passage of at least a portion of the retention bodies 136 through the openings 176 in the second projection 166 and into at least a portion of the second cavity 168, as discussed below.

The recessed section 180 of the trigger 128 is sized to accommodate displacement of at least a portion, if not all, of the retention bodies 136 through a corresponding opening 176 in the second projection 166 and into the second cavity 168 of the second projection 166. Moreover, the recessed section 180 is sized to, when positioned generally adjacent to the openings 176 in the second projection 166 following the release of the trigger 128 from the first, locked position, provide an area within the second cavity 168 into which at least a portion of the retention bodies 136 can be received. As discussed below, such generally inward displacement of the retention bodies 136 can assist in the retention bodies 136 being moved to a position at which the retention bodies 136 do not prevent, and/or interfere, with the firing pin 130 being displaced from the first locked position, as seen in FIG. 4A, to the second, unlocked position, as seen in FIG. 4B.

Figure 6:
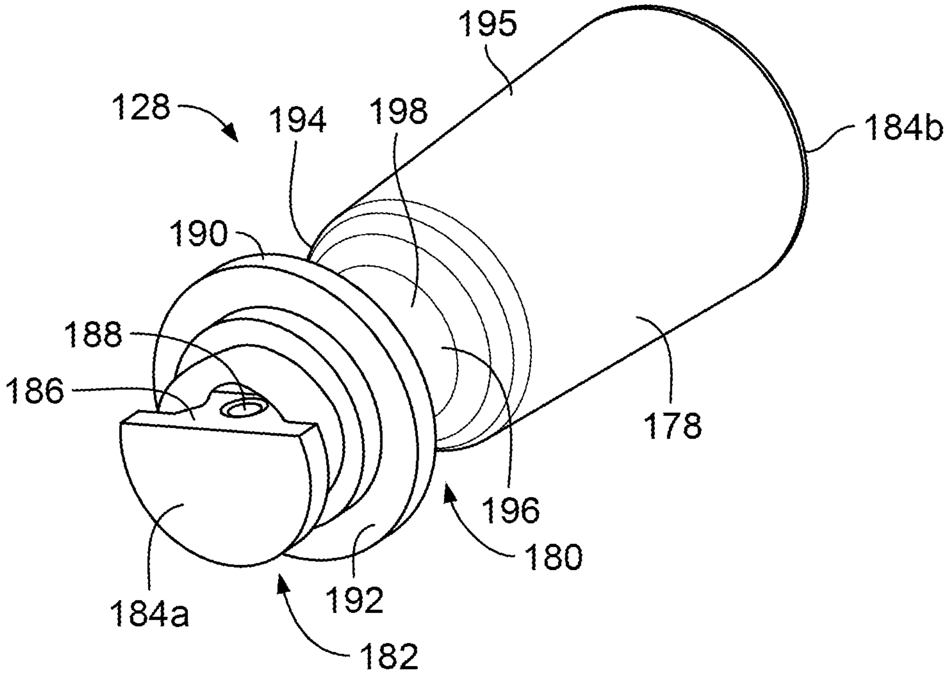
FIG. 6 illustrates a perspective view of an exemplary embodiment of a trigger for the strike pin assembly shown in at least FIGS. 3 and 4.

As seen in at least FIG. 6, the space 194 provided by the recessed section 180 of the trigger 128 for receipt of at least a portion of retention bodies 136 in the second cavity 168 can generally be defined, at least in part, by a first wall 196 and a second wall 198 of the recessed section 180. Further, the second wall 198 generally linearly extends from the retention base 190 and toward the first wall 196. As illustrated, according to certain embodiments, the first wall 196, which can be adjoined to the engagement section 178, can be tapered toward the second wall 198 that can be steeper than the above-discussed taper along the engagement section 178 of the trigger 128. Such a taper of the first wall 196 can be configured to assist in controlling the rate of displacement of the retention bodies 136 into the space 194. However, the first wall 196 can have a variety of other shapes and configurations, including, for example, being generally orthogonal to the second wall 198.

The adapter 132 can be configured to adapt the strike pin assembly 100 for a particular application, including, but not limited to, use with a particular cutoff body 14 configuration and/or associated upper casting or sleeve 106. Additionally, the adapter 132 can be configured for use of the strike pin assembly 100 with fuses used in a variety of other applications, including, applications other than, or in addition to, those applications involving fuse cutout assemblies 10. For example, according to certain embodiments, the adapter 132 can have an outer cylindrical configuration similar to the second end cap 114*b* shown in FIG. 2.

Figure 7:
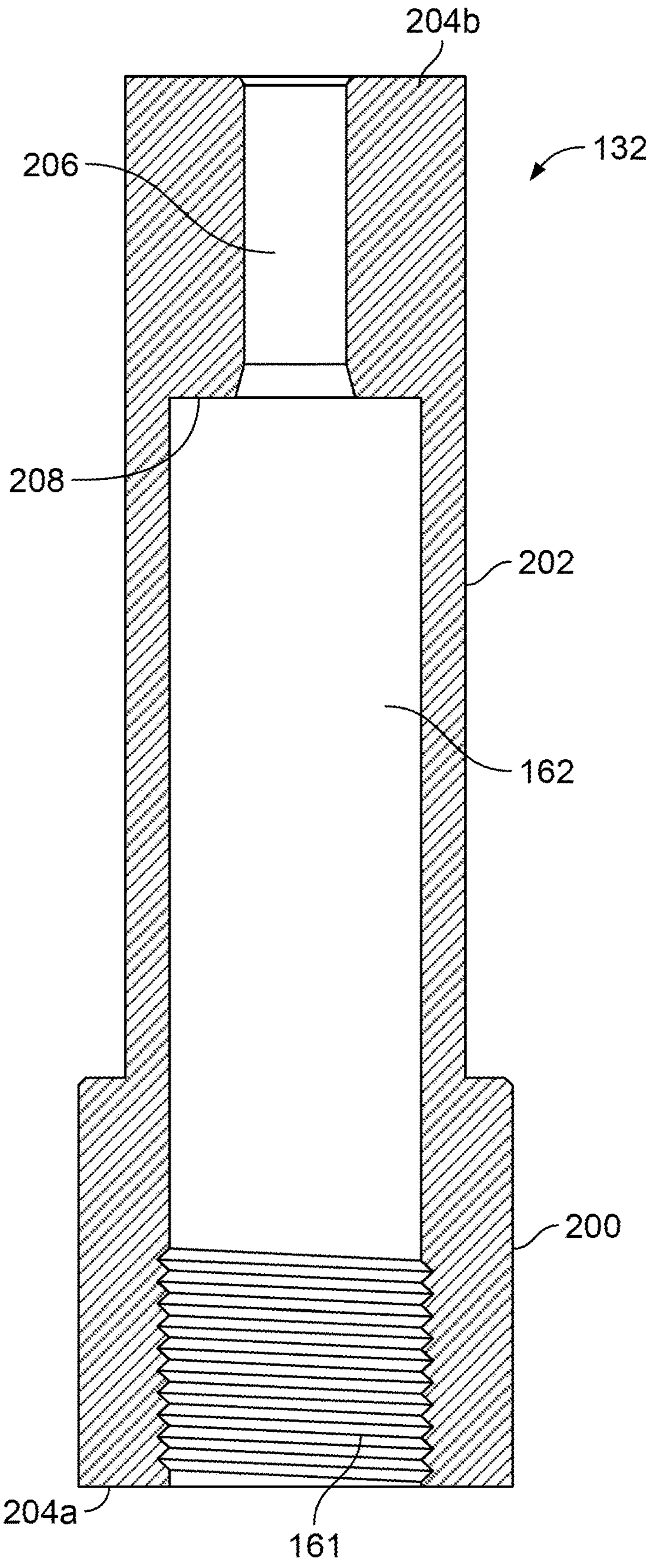
FIG. 7 illustrates a side cross sectional view of an exemplary embodiment of an adapter for the strike pin assembly shown in at least FIGS. 3 and 4.

As seen in FIGS. 4A, 4B, and 7, according to the illustrated embodiment, the adapter 132 has a first barrel portion 200 and a second barrel portion 202, the first barrel portion 200 extending from a proximate end 204*a* of the adapter 132 to the second barrel portion 202, and the second barrel portion 202 extending to a distal end 204*b* of the adapter 132. According to the illustrated embodiment, the outer size, such as, for example, outer diameter or width, of the first barrel portion 200 is larger than the corresponding size, such as outer diameter or width, of the second barrel portion 202. Again, such relative sizing can, according to certain embodiments, be based on the components that may engage the adapter 132, such as, for example, the associated upper casting or sleeve 106 that may be coupled to the adapter 132. Additionally, the first barrel portion 200 can have a configuration that can assist in securing the adapter 132 to the cap 126, including via the previously discussed threaded engagement. For example, according to certain embodiments, the first barrel portion 200 can have outer configuration, such as a plurality of flat sides, as partially seen for example in FIGS. 2 and 3, that can facilitate engagement of a tool, such as, for example, a wrench or socket, with the first barrel portion 200. Thus, for example, according to certain embodiments, the outer portion of the first barrel portion 200 can have a hexagonal configuration.

The first bore 162 of the adapter 132 can extend through the first barrel portion 200, and at least a portion of the second barrel portion 202. Moreover, according to certain embodiments, as seen in FIG. 7, the first bore 162 can extend through at least half, if not more, of the second barrel portion 202. Further, as seen in at least FIG. 7, as previously discussed, the first bore 162 can include an internal thread 161 that engages such that it is mated to the external thread 159 of the cap 126, the internal thread 161 extending into the first bore 162 from the proximate end 204*a* of the adapter 132.

A second bore 206 of the adapter 132 can extend from the first bore 162 and to, as well as through, the distal end 204*b* of the adapter 132. The second bore 206, which is in fluid communication with the first bore 162, can have a size, such as, for example, diameter, that is smaller than corresponding size, such as, for example, diameter, of the first bore 162. Such differences in sizes between the first bore 162 and second bore 206 can provide a bore retention wall 208 at the distal end of the first bore 162 that can assist in limiting the distance that the firing pin 130 can axially travel after being released from the first, locked position. The size, such as, for example, diameter, of the second bore 206 of the adapter 132 can also accommodate displacement of a portion, but not all, of the firing pin 130 in the second bore 206.

Figure 8:
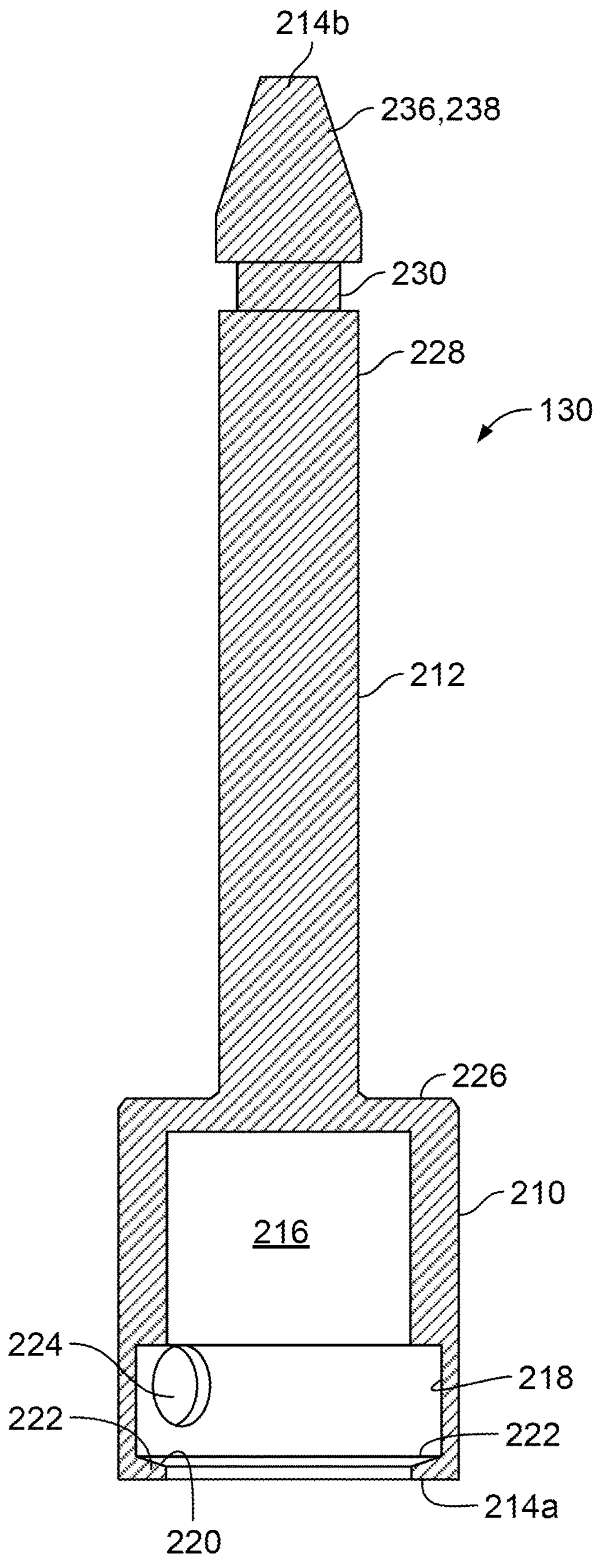
FIG. 8 illustrates a side cross sectional view of an exemplary embodiment of a firing pin for the strike pin assembly shown in at least FIGS. 3 and 4.

Referencing FIGS. 4A, 4B, and 8, the firing pin 130 has a base portion 210 and a projection portion 212 that are positioned between a proximate end 214*a* and a distal end 214*b* of the firing pin 130. The base portion 210 can have a generally cylindrical configuration that is sized for at least axial displacement of the base portion 210 within the first bore 162 of the adapter 132. Additionally, the base portion 210 has an aperture 216 that provides an opening through the proximate end 214*a* of the firing pin 130, and which extends into the base portion 210. The aperture 216 is sized and positioned such that, at least when the strike pin assembly 100, and thus the firing pin 130, are at the first, locked position, receives placement of at least a portion of the second projection 166 of the cap 126 and the distal end 184*b*, and thus at least a portion of the engagement section 178, of the trigger 128.

The aperture 216 in the base portion 210 of the firing pin 130 also includes a recess 218 that outwardly extends and is sized to house at least a portion of the retention bodies 136. As seen in at least FIGS. 4A, 4B, and 8, the recess 218 is offset from the proximate end 214*a* of the firing pin 130 such that a lip or retention wall 220 is provided between the recess 218 and the proximate end 214*a* of the firing pin 130. According to certain embodiments, the retention wall 220 has an inner surface 222 that is inwardly tapered generally in the direction of the central axis 134, and upon which the retention bodies 136 may be seated when the strike pin assembly 100 is at the first, locked position. While the degree of taper can vary, according to certain embodiments the taper orients the inner surface 222 of the retention wall 220 at an angle that is non-perpendicular to the central axis 134.

The base portion 210 of the firing pin 130 can have one or more openings 224 that extend through the base portion 210, and that are axially aligned with the recess 218. Such openings 224 can accommodate insertion of one or more retention bodies 136 through the base portion 210 and into at least a portion of the recess 218. Additionally, according to certain embodiments, the firing pin 130, which abuts, and can be at least partially directly supported by, the second, outer biasing element 140, can be axially displaced or depressed in a manner that compresses the second, outer biasing element 140 such that an opening 224 of the firing pin 130 can be generally aligned with the openings 176 in the second projection 166 of the cap 126. According to certain embodiments, the firing pin 130 includes one opening 224, and the second projection 166 includes a plurality of openings 176, such as, for example, three openings 176.

According to certain embodiments, the firing pin 130 can be rotatable relative to at least the cap 126. Thus, the firing pin 130 can be rotated, as well as linearly displaced in a manner that compresses the second, outer biasing element, such that the opening 224 of the firing pin 130 can be aligned with an opening 176 in the second projection 166. According to such embodiments, when the opening 224 of the firing pin 130 is displaced into alignment with a first opening of the plurality of openings 176 in the second projection 166 of the cap 126, a first retention body 136 can be inserted through the opening 224 of the firing pin 130 such that the first retention body 136 is positioned at least in the recess 218 of the aperture 216 of the firing pin 130, as well as at least partially extends into the first opening 176 of the second projection 166 of the cap 126. The extent that the first retention body 136 can be inserted, if at all, through the first opening 176 of the second projection 166 during such loading of the first retention body 136 can be limited by the distal end 184*b* of the trigger 128 that is on the opposing side of the first opening 176 of the second projection 166.

With the first retention body 136 loaded in at least the recess 218, the firing pin 130 can again be rotated, and depressed if needed, relative to the cap 126 such that the opening 224 of the firing pin 130 then aligned with another, or second, opening 176 in the second projection 166 of the cap 126. With the opening 224 of the firing pin 130 aligned with the second opening 176 in the second projection 166, a second retention body 136 can be inserted into the recess 218 and an associated second opening 176 in the second projection 166. Additionally, with the opening 224 of the firing pin 130 aligned with the second opening 176 in the second projection 166, the previously loaded first retention body 136 can be securely positioned between a portion of the base portion 210 of the firing pin 130 that does not include the opening 224 and a portion of the trigger 128 that is adjacent to the corresponding opening 176 in the second projection 166. Thus, the previously loaded first retention body 136 can be prevented from being outwardly displaced from the recess 218 in the firing pin 130 as well as prevented from being inwardly displaced out of the opening 176 in the second projection 166. Further, the openings 176 of the second projection 166 and the recess 218 of the firing pin 130 can be sized to prevent, at least when the strike pin assembly 100 is in the first, locked position, the retention bodies 136 from being radially displaced in the recess 218 at least relative to corresponding opening 176 in the second projection 166.

The process of aligning the opening 224 of the firing pin 130 with an opening 176 in the second projection 166, and subsequently inserting a retention body 136 into the recess 218 and at least partially into the associated opening 176 in the second projection 166, can continue until each retention body 136 is loaded into the strike pin assembly 100. With each retention body 136 positioned within the recess 218 extending into at least a portion of an adjacent opening 176 in the second projection 166, the force used to depress the firing pin 130, and thus used to at least partially further compress the second, outer biasing element 140, can be released. The release of such a force can result in a degree of decompression of the second, outer biasing element 140 so that the firing pin 130 is raised in a generally axial direction by a force exerted against the firing pin 130 by the second, outer biasing element 140. Such axial displacement of the firing pin 130 can result in the opening 224 of the firing pin 130 being misaligned with the openings 176 in the second projection 166, as shown for example in FIG. 4A. Further, such axial displacement of the firing pin 130 can result in the firing pin 130 being axially raised to a position at which the inner surface 222 of the retention wall 220 of the recess 218 of the firing pin 130 is positioned against the adjacent retention bodies 136. Such engagement between the retention wall 220 of the recess 218 of the firing pin 130 and the retention bodies 136 while the retention bodies 136 also extend into corresponding openings 176 in the second projection 166 can allow the retention bodies 136 to provide a barrier or resistance to further axial displacement of the firing pin 130 in a direction generally toward the distal end 144*b* of the strike pin assembly 100. Such prevention of movement of the firing pin 130 also prevents further decompression of the second, outer biasing element 140. Accordingly, such a barrier or resistance provided by the retention bodies 136 can at least assist in locking the firing pin 130 in the first, locked position, as seen in FIG. 4A.

The projection portion 212 of the firing pin 130 can extend from a central location of the base portion 210 of the firing pin 130 such that the base portion 210 and the projection portions 212 are configured to be centrally located along the central axis 134, and thus centrally located in the adapter 132. Further, the projection portion 212 is sized to extend through a portion of the first bore 162, as well as the second bore 206, of the adapter 132. At least a portion of the projection portion 212 can have a shape that is similar to a corresponding shape of the base portion 210, such as, for example, a generally cylindrical shape. However, the size of the projection portion 212, such as, for example, an outer diameter, can be smaller than the corresponding size of the base portion 210 such that an upper portion 240 of the base portion 210 can provide the firing pin 130 with a shoulder 226 (FIG. 8) an the upper portion 240 of the base portion 210. The shoulder 226 can be sized and position to, after the firing pin 130 has been released from the first, locked position and reaches the second, unlocked position, at least temporarily abut the bore retention wall 208 of the adapter 132 in a manner that can prevent the firing pin 130 from being released or separated from the adapter 132, and thus prevent the firing pin 130 from being separated from the remainder of the strike pin assembly 100. Additionally, the projection portion 212 of the firing pin 130 can have a size, such as, for example, an outer diameter that is similar, but slightly smaller, than an inner diameter of the second bore 206 of the adapter 132. Such relative sizes can assist in guiding, but not prevent, the axial displacement of at least the projection portion 212 of the firing pin 130 along the second bore 206 of the adapter 132 as the firing pin 130 is displaced to the second, unreleased position.

As seen in at least FIG. 8, the outer surface 228 of the projection portion 212 of the firing pin 130 can include a groove 230 that is sized to receive placement of a first seal 232 (FIG. 4A), such as, for example, a ring shaped elastomeric seal. The first seal 232 can be sized to, when positioned in the groove 230 of the firing pin 130, abut an adjacent portion of second bore 206 of the adapter 132 so as to form a seal that can at least attempt to prevent the ingress of materials, including, for example, debris and water, into at least the first bore 162 among the components, of the strike pin assembly 100.

The strike pin assembly 100 can also include a second seal 234 that is secured to the distal end 204*b* of the adapter 132, and which extends over at least the second bore 206 of the adapter 132. The second seal 234 can be sized and positioned to prevent the ingress of debris and/or water into the strike pin assembly 100 through the second bore 206 of the adapter 132. According to certain embodiments, second seal 234 is constructed from a foil material. Additionally, upon activation of the strike pin assembly 100, a head portion 236 of the projection portion 212 of the firing pin 130 can puncture through the second seal 234 as the firing pin 130 is displaced to the second, unlocked position, as seen for example in FIG. 4B. As seen in at least FIG. 8, according to certain embodiments, the head portion 236 extends to the distal end 214*b* of the firing pin 130, and can have a conical or frustoconical configuration that is formed by an inwardly tapered wall 238 of the projection portion 212. Such a configuration of the head portion 236 can at least assist in the firing pin 130 puncturing through the second seal 234. Additionally, as seen in at least FIGS. 4A and 4B, according to certain embodiments, the groove 230 for the first seal 232 can be positioned generally beneath the head portion 236.

The first, inner biasing element 138 and the second, outer biasing element 140 can be axially positioned such a portion of the second, outer biasing element 140 axially overlaps, but is radially offset from, the first, inner biasing element 138. For example, as shown in at least FIG. 4A, an upper portion of the first, inner biasing element 138, and a lower portion of the larger second, outer biasing element 140 may be axially positioned so as to be separated from each other by a portion of the second projection 166 of the cap 126. Further, the first, inner biasing element 138 and second, outer biasing element 140, can provide different degrees of biasing forces. For example, according to embodiments in which the first, inner biasing element 138 and second, outer biasing element 140, are springs, the second, outer biasing element 140 can have a spring force that is greater than a corresponding spring force of the first, inner biasing element 138.

As discussed above, during use, the strike pin assembly 100 can be maintained in the first, locked position, as shown in FIG. 4A, by at least the holding force provided by the engagement of the filament 122 with the trigger 128, and the interference between the loaded one or more retention bodies 136 and the firing pin 130. In the event of a current surge or overload, the degree of current flowing through the fuse element 118 can result in the fuse element 118 generating heat and/or hot gases within the casing 112 that can result in the filament 122 breaking, such as, for example, due to melting of the filament 122. Such breakage of the filament 122 can release the holding force that the filament 122 provided to the trigger 128. In the absence of such a holding force, the first, inner biasing element 138 can decompress such that a biasing force is provided by the first, inner biasing element 138 against the trigger 128 that causes the trigger 128 to be axially displaced in a first direction generally toward the distal end 144*b* of the strike pin assembly 100.

As the trigger 128 is displaced in the first direction, the tapered wall 195 of the engagement section 178 of the trigger 128 is displaced past the adjacent opening 176 in the second projection 166. As previously, discussed, as the tapered wall 195 is displaced, the distance separating the opening 176 of the second projection 166 and the tapered wall 195 of the engagement section 182 increases, thereby gradually increasing the size of an area in the second cavity 168 between the openings 176 in the second projection 166 and the adjacent portion of the tapered wall 195 of the trigger 128. The area in the second cavity 168 between the openings 176 of the second projection of the cap 126 and the tapered wall 195 of the trigger 128 can provide an area to receive placement of a portion an adjacent retention body 136. Thus, the increase in the size of the available area in the second cavity 168 to receive at least a portion of the retention bodies 136 through the openings 176 increases as the tapered wall 195 of the trigger 128 continues to pass the openings 176, which can thereby result in a corresponding increase in the amount or portion of each of the retention bodies 136 that is inwardly displaced through the opening 176 and into the second cavity 168. Further, the trigger 128 is continued to be displaced until the space 194 provided by the recessed section 180 of the trigger 128 is generally positioned to receive at least enough of the retention bodies 136 such that the retention bodies 136 are no longer positioned to impede or prevent displacement of the firing pin 130 toward the second, unlocked position.

Thus, with the space 194 provided by the recessed section 180 of the trigger 128 positioned to receive at least a portion of the retention bodies 136, the retention bodies 136 may be inwardly displaced into at least a portion of the space 194 within the second cavity 168. Such inward displacement of the retention bodies 136 can be facilitated, at least in part, by the force being exerted by the firing pin 130, through the second, outer biasing element 140, against the retention bodies 136. Moreover, as the space 194 provided by the recessed section 180 of the trigger 128 becomes positioned adjacent to the openings 176 of the second projection 166, the firing pin 130 may begin to be displaced in the first direction generally toward the distal end 144*b* of the strike pin assembly 100 by the biasing force of the second, outer biasing element 140. As the firing pin 130 begins to be displaced in the first direction as the second, outer biasing element is being decompressed, the inner surface 222 of the retention wall 220 of the recess 218 of the firing pin 130 may facilitate the inward displacement of at least a portion of the retention bodies 136 into the space 194 provided by the recessed section 180 of the trigger 128 in the second cavity 168 so as to remove the retention bodies 136 from positions at which the retention bodies 136 could otherwise interfere with, or prevent, the displacement of the firing pin 130.

With the retention bodies 136 inwardly displaced to locations that do not impede the axial displacement of the firing pin 130, the second, outer biasing element 140 is decompressed, or continued to be depressed so as to provide a force that axially displaces the firing pin 130 from the first, locked position, as shown in FIG. 4A, to the second, unlocked position, as shown for example in FIG. 4B. As the firing pin 130 is displaced to the second, unlocked position, at least the head portion 236 of the projection portion 212 of the firing pin 130 can pass through the second seal 234, and outwardly project from the adapter 132. According to certain embodiments, the extent and/or distance to which the projection portion 212 of the firing pin 130 extends out of the adapter 132, as well as the associated speed and/or force with which the firing pin 130 is displaced, can be based on the device or component that the firing pin 130 is to strike. For example, according to certain embodiments, the firing pin 130 may strike the upper contact 18 of the cutout body 14 in a manner that can compress the associated biasing element 22 of the cutout body 14 in a manner that can facilitate disengagement between the upper contact 18 of the cutout body 14 and the strike pin assembly 100, first contact 102, and/or adapter 132 of the fuse element 118. Upon such disengagement, the fuse assembly 12 can be pivotally displaced relative to the cutout body 14 such that the strike pin assembly 100 and/or first contact 102 are pivotally displaced away, and electrically disconnected from, the upper contact 18 of the cutout body 14. However, according to other embodiments, the firing pin 130 may be configured to strike other components of electrical systems, such as, for example, strike a tripping plate of a circuit breaker in a manner that displaces the tripping plate so as to open the circuit breaker.

Further written description of a number of exemplary embodiments shall now be provided. One embodiment is a fuse assembly comprising: a casing having an interior region, the interior region housing at least a portion of a fuse element and a filament; and a strike pin assembly comprising: a cap coupled to the casing, the cap having a plurality of openings; an adapter coupled to the cap; a firing pin housed within the adapter, at least a distal end of the cap being positioned within an aperture of the firing pin when the strike pin assembly is at a locked position, the aperture having a recess that is separated from a proximate end of the firing pin by a retention wall, at least a portion of the firing pin sized to be displaced to a position outside of the adapter upon a release of the strike pin assembly from the locked position; a plurality of retention bodies, at least a portion of the plurality of retention bodies being positioned, when the strike pin assembly is at the locked position, within the recess and at least partially extending into an adjacent opening of the plurality of openings of the cap; a trigger being releasably secured within a cavity of the cap by the filament when the strike pin assembly is in the locked position, at least a portion of an engagement section of the trigger being positioned adjacent to the plurality of openings when the strike pin assembly is in the locked position and sized to prevent removal of the plurality of retention bodies from the recess of the firing pin through the plurality of openings, the trigger further including a recessed section sized to accommodate a displacement of each of the plurality of retention bodies from the recess of the firing pin and at least partially through the plurality of openings and into the cavity of the cap in response to the release of the strike pin assembly from the locked position; a first biasing element positioned to displace, in response to a breakage in the filament, the trigger in a distal direction and to a location at which the recessed section accommodates the displacement of each of the plurality of retention bodies; and a second biasing element positioned to displace the firing pin in the distal direction in response to the displacement of each of the plurality of retention bodies.

In some aspects, the plurality of openings of the cap are positioned adjacent to a distal end of the cap, a proximate end of the cap being coupled to the casing. In some aspects, the cap further comprises a base portion, a first projection, and a second projection, the base portion being coupled to the cap, the first projection being threadingly coupled to the adapter, and the second projection housing the trigger and the first biasing element, the plurality of openings extending through the second projection. In some aspects, the cavity of the cap is a second cavity of the second projection, the first projection having a first cavity that is in fluid communication with an inner region of the base portion of the cap, the first cavity and the second cavity being at least partially separated by a cavity wall, the cavity wall having an opening sized to accommodate passage of the filament through the first cavity and into the second cavity.

In some aspects, the first cavity provides a central support location for at least one of the fuse element and a support core for the fuse element. In some aspects, the fuse elements comprises a polyetheretherketone (PEEK) material.

In some aspects, the retention wall of the firing pin includes an inner surface that abuts the plurality of retention bodies when the firing pin is at the locked position, the inner surface being tapered to facilitate the displacement of the plurality of retention bodies. In some aspects, the firing pin has a base portion and a projection portion, the base portion being housed within a first bore of the adapter, at least a portion of the projection portion being positioned in a second bore of the adapter and configured to extend from the adapter in response to the strike pin assembly being released from the locked position, and wherein the adapter includes a bore retention wall at a distal end of the first bore that is sized to abut a shoulder of the firing pin to limit a distance of displacement of the firing pin in the distal direction.

In some aspects of the foregoing fuse assembly, the fuse assembly further includes a first seal positioned about the projection portion of the firing pin and against an inner surface of the second bore and a second seal positioned about a distal end of the adapter, and wherein a distal end of the projection portion is configured to puncture the second seal. In some aspects, the second biasing element has a spring force that is larger than a spring force of the first biasing element, and wherein at least a portion of the second biasing element is axially positioned to overlap at least a portion of the first biasing element.

Another exemplary embodiment is a method for operating a strike pin assembly of a fuse assembly comprising: in response to a temperature generated by operation of a fuse element of the fuse assembly, breaking a filament of the fuse assembly; releasing a holding force provided by the filament of the fuse assembly on a trigger of the strike pin assembly, the holding force maintaining the trigger at a position that prevents a displacement of a plurality of retention bodies from a recess of a firing pin of the strike pin assembly; displacing, upon the release of the holding force and via a biasing force of a first biasing element, the trigger in a first direction toward a distal end of the strike pin assembly; displacing, upon displacement of the trigger, the plurality of retention bodies from the recess of the firing pin; and displacing, in response to the displacement of the plurality of retention bodies and via a biasing force of a second biasing element, the firing pin in the first direction such that a distal end of the firing pin protrudes out of an adapter of the strike pin assembly.

In some aspects of the foregoing method, displacing the trigger comprises displacing the trigger to a location at which a recessed section of the trigger is positioned to accommodate the displacement of at least a portion of each of the plurality of retention bodies through an adjacent opening in a cap of the strike pin assembly. In some aspects of the foregoing method, the trigger is released by the holding force from a position within a cavity of a projection of the cap, and wherein the first and second biasing elements are at least partially positioned on opposing sides of the projection.

In some aspects of the foregoing method, the displacement of the plurality of retention bodies comprises displacing the plurality of retention bodies along a tapered inner surface of a retention wall of the recess of the firing pin to a recessed section of the trigger.

In some aspects of the foregoing method, the method includes preventing, by the trigger prior to the release of the holding force, displacement of the plurality of retention bodies.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

The invention claimed is:

1. A fuse assembly comprising:

a casing having an interior region, the interior region housing at least a portion of a fuse element and a filament; and a strike pin assembly comprising:

a cap coupled to the casing, the cap having a plurality of openings;

an adapter coupled to the cap;

a firing pin housed within the adapter, at least a distal end of the cap being positioned within an aperture of the firing pin when the strike pin assembly is at a locked position, the aperture having a recess that is separated from a proximate end of the firing pin by a retention wall, at least a portion of the firing pin sized to be displaced to a position outside of the adapter upon a release of the strike pin assembly from the locked position;

a plurality of retention bodies, at least a portion of the plurality of retention bodies being positioned, when the strike pin assembly is at the locked position, within the recess and at least partially extending into an adjacent opening of the plurality of openings of the cap;

a trigger being releasably secured within a cavity of the cap by the filament when the strike pin assembly is in the locked position, at least a portion of an engagement section of the trigger being positioned adjacent to the plurality of openings when the strike pin assembly is in the locked position and sized to prevent removal of the plurality of retention bodies from the recess of the firing pin through the plurality of openings, the trigger further including a recessed section sized to accommodate a displacement of each of the plurality of retention bodies from the recess of the firing pin and at least partially through the plurality of openings and into the cavity of the cap in response to the release of the strike pin assembly from the locked position;

a first biasing element positioned to displace, in response to a breakage in the filament, the trigger in a distal direction and to a location at which the recessed section accommodates the displacement of each of the plurality of retention bodies; and a second biasing element positioned to displace the firing pin in the distal direction in response to the displacement of each of the plurality of retention bodies.

2. The fuse assembly of claim 1, wherein the plurality of openings of the cap are positioned adjacent to a distal end of the cap, a proximate end of the cap being coupled to the casing.

3. The fuse assembly of claim 1, wherein the cap further comprises a base portion, a first projection, and a second projection, the base portion being coupled to the cap, the first projection being coupled to the adapter, and the second projection housing the trigger and the first biasing element, the plurality of openings extending through the second projection.

4. The fuse assembly of claim 3, wherein the first projection of the cap is threadingly coupled to the adapter.

5. The fuse assembly of claim 4, wherein the cavity of the cap is a second cavity of the second projection, the first projection having a first cavity that is in fluid communication with an inner region of the base portion of the cap, the first cavity and the second cavity being at least partially separated by a cavity wall, the cavity wall having an opening sized to accommodate passage of the filament through the first cavity and into the second cavity.

6. The fuse assembly of claim 5, wherein the first cavity provides a central support location for at least one of the fuse element and a support core for the fuse element.

7. The fuse assembly of claim 5, wherein the fuse element comprises a polyetheretherketone (PEEK) material.

8. The fuse assembly of claim 1, wherein the retention wall of the firing pin includes an inner surface that abuts the plurality of retention bodies when the firing pin is at the locked position, the inner surface being tapered to facilitate the displacement of the plurality of retention bodies.

9. The fuse assembly of claim 1, wherein the firing pin has a base portion and a projection portion, the base portion being housed within a first bore of the adapter, at least a portion of the projection portion being positioned in a second bore of the adapter and configured to extend from the adapter in response to the strike pin assembly being released from the locked position.

10. The fuse assembly of claim 9, wherein the adapter includes a bore retention wall at a distal end of the first bore that is sized to abut a shoulder of the firing pin to limit a distance of displacement of the firing pin in the distal direction.

11. The fuse assembly of claim 10, further including a first seal positioned about the projection portion of the firing pin and against an inner surface of the second bore.

12. The fuse assembly of claim 11, further including a second seal positioned about a distal end of the adapter, and wherein a distal end of the projection portion is configured to puncture the second seal.

13. The fuse assembly of claim 1, wherein the second biasing element has a spring force that is larger than a spring force of the first biasing element.

14. The fuse assembly of claim 9, wherein at least a portion of the second biasing element is axially positioned to overlap at least a portion of the first biasing element.

15. A method for operating a strike pin assembly of a fuse assembly comprising:

releasing a holding force provided by a filament of the fuse assembly on a trigger of the strike pin assembly, the holding force maintaining the trigger at a position that prevents a displacement of a plurality of retention bodies from a recess of a firing pin of the strike pin assembly;

displacing, upon the release of the holding force and via a biasing force of a first biasing element, the trigger in a first direction toward a distal end of the strike pin assembly;

displacing, upon displacement of the trigger, the plurality of retention bodies from the recess of the firing pin; and displacing, in response to the displacement of the plurality of retention bodies and via a biasing force of a second biasing element, the firing pin in the first direction such that a distal end of the firing pin protrudes out of an adapter of the strike pin assembly.

16. The method of claim 15, wherein the releasing of the holding force comprises breaking the filament in response to a temperature generated by operation of a fuse element of the fuse assembly.

17. The method of claim 16, wherein displacing the trigger comprises displacing the trigger to a location at which a recessed section of the trigger is positioned to accommodate the displacement of at least a portion of each of the plurality of retention bodies through an adjacent opening in a cap of the strike pin assembly.

* * * * *